(12) United States Patent
Biskeborn

(10) Patent No.: US 10,741,204 B2
(45) Date of Patent: *Aug. 11, 2020

(54) MULTI-MODE, MULTI-CHANNEL MAGNETIC RECORDING HEAD AND APPARATUS

(71) Applicant: International Business Machines Corporation, Armonk, NY (US)

(72) Inventor: Robert G. Biskeborn, Hollister, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/355,553

(22) Filed: Mar. 15, 2019

(65) Prior Publication Data

US 2019/0214047 A1 Jul. 11, 2019

Related U.S. Application Data

(63) Continuation of application No. 15/934,815, filed on Mar. 23, 2018, now Pat. No. 10,319,399, which is a continuation of application No. 15/460,091, filed on Mar. 15, 2017, now Pat. No. 9,978,411.

(51) Int. Cl.
| | |
|---|---|
| *G11B 5/09* | (2006.01) |
| *G11B 5/48* | (2006.01) |
| *G11B 5/008* | (2006.01) |
| *G11B 5/584* | (2006.01) |
| *G11B 20/12* | (2006.01) |
| *G11B 20/10* | (2006.01) |

(52) U.S. Cl.
CPC ........ *G11B 5/4893* (2013.01); *G11B 5/00813* (2013.01); *G11B 5/584* (2013.01); *G11B 20/1201* (2013.01); *G11B 2020/1087* (2013.01)

(58) Field of Classification Search
None
See application file for complete search history.

(56) References Cited

U.S. PATENT DOCUMENTS

| | | | |
|---|---|---|---|
| 5,386,324 A * | 1/1995 | Fry | G11B 15/026 360/31 |
| 5,689,384 A | 11/1997 | Albrecht et al. | |
| 6,539,165 B1 * | 3/2003 | Rijckaert | G11B 15/1875 386/205 |
| 6,724,561 B1 * | 4/2004 | Wyman | G11B 5/584 360/76 |
| 7,570,450 B2 | 8/2009 | Koeppe | |

(Continued)

OTHER PUBLICATIONS

Supplemental Notice of Allowance from U.S. Appl. No. 16/355,415, dated Jul. 22, 2019.

(Continued)

*Primary Examiner* — Peter Vincent Agustin
(74) *Attorney, Agent, or Firm* — Zilka-Kotab, P.C.

(57) ABSTRACT

An apparatus according to one embodiment includes an array of transducers, where the array of transducers includes at least one contiguous group of transducers in a number specified in a format and at least two servo readers, where the servo readers are symmetrically positioned about the contiguous group of transducers and the servo readers are asymmetrically positioned relative to a centerline of the array of transducers.

11 Claims, 18 Drawing Sheets

(56) References Cited

U.S. PATENT DOCUMENTS

| | | | |
|---|---|---|---|
| 7,852,599 B2 | 12/2010 | Bui et al. | |
| 8,233,246 B2 | 7/2012 | Koeppe | |
| 8,587,905 B2 | 11/2013 | Koeppe | |
| 8,773,795 B1 | 7/2014 | Biskeborn | |
| 9,142,224 B2 | 9/2015 | Hansen et al. | |
| 9,196,264 B2 | 11/2015 | Biskeborn | |
| 9,978,411 B1* | 5/2018 | Biskeborn | G11B 20/1201 |
| 10,311,904 B2 | 6/2019 | Biskeborn | |
| 10,319,399 B2* | 6/2019 | Biskeborn | G11B 20/1201 |
| 10,446,179 B2 | 10/2019 | Biskeborn | |
| 10,453,483 B2 | 10/2019 | Biskeborn | |
| 10,453,484 B2 | 10/2019 | Biskeborn | |
| 2006/0039082 A1* | 2/2006 | Biskeborn | G11B 5/4893 360/129 |
| 2006/0274446 A1* | 12/2006 | Johnson | G11B 5/584 360/77.12 |
| 2007/0047142 A1* | 3/2007 | Biskeborn | G11B 5/00826 360/129 |
| 2007/0091505 A1* | 4/2007 | Koeppe | G11B 5/0083 360/123.12 |
| 2008/0088963 A1* | 4/2008 | Biskeborn | G11B 5/00826 360/77.12 |
| 2008/0137235 A1* | 6/2008 | Biskeborn | G11B 5/584 360/317 |
| 2009/0231756 A1 | 9/2009 | Koeppe | |
| 2010/0177436 A1* | 7/2010 | Bui | G11B 5/584 360/77.12 |
| 2011/0176237 A1* | 7/2011 | Bui | G11B 5/584 360/48 |
| 2012/0008234 A1* | 1/2012 | Biskeborn | G11B 5/584 360/77.12 |
| 2012/0236433 A1 | 9/2012 | Koeppe | |
| 2012/0287527 A1* | 11/2012 | Biskeborn | G11B 5/50 360/46 |
| 2015/0062740 A1* | 3/2015 | Cherubini | G11B 20/1204 360/48 |
| 2018/0268849 A1* | 9/2018 | Biskeborn | G11B 20/1201 |
| 2018/0268850 A1* | 9/2018 | Biskeborn | G11B 20/1201 |
| 2019/0214043 A1 | 7/2019 | Biskeborn | |
| 2019/0214044 A1 | 7/2019 | Biskeborn | |
| 2019/0214045 A1 | 7/2019 | Biskeborn | |
| 2019/0214046 A1 | 7/2019 | Biskeborn | |
| 2019/0362747 A1 | 11/2019 | Biskeborn | |
| 2019/0362748 A1 | 11/2019 | Biskeborn | |
| 2019/0362749 A1 | 11/2019 | Biskeborn | |

OTHER PUBLICATIONS

Supplemental Notice of Allowance from U.S. Appl. No. 16/355,451, dated Jul. 25, 2019.
Supplemental Notice of Allowance from U.S. Appl. No. 16/355,534, dated Jul. 22, 2019.
Biskeborn R.G., U.S. Appl. No. 16/533,595, filed Aug. 6, 2019.
Biskeborn R.G., U.S. Appl. No. 16/533,611, filed Aug. 6, 2019.
Biskeborn R.G., U.S. Appl. No. 16/533,625, filed Aug. 6, 2019.
Notice of Allowance from U.S. Appl. No. 16/355,415, dated Jun. 12, 2019.
Notice of Allowance from U.S. Appl. No. 16/355,534, dated Jun. 12, 2019.
Koeppe, R, U.S. Appl. No. 13/480,390, filed May 24, 2012.
Koeppe, P., U.S. Appl. No. 12/047,075, filed Mar. 12, 2008.
Biskeborn, R.G., U.S. Appl. No. 13/923,280, filed Jun. 20, 2013.
Biskeborn, R.G., U.S. Appl. No. 15/460,091, filed Mar. 15, 2017.
Restriction Requirement from U.S. Appl. No. 15/460,091, dated Aug. 15, 2017.
Non-Final Office Action from U.S. Appl. No. 15/460,091, dated Sep. 20, 2017.
Notice of Allowance from U.S. Appl. No. 15/460,091, dated Jan. 19, 2018.
Biskeborn R.G., U.S. Appl. No. 15/933,118, filed Mar. 22, 2018.
Biskeborn R.G., U.S. Appl. No. 15/934,815, filed Mar. 23, 2018.
Restriction Requirement from U.S. Appl. No. 15/933,118, dated Oct. 19, 2018.
Restriction Requirement from U.S. Appl. No. 15/934,815, dated Oct. 19, 2018.
Notice of Allowance from U.S. Appl. No. 15/933,118, dated Jan. 23, 2019.
Notice of Allowance from U.S. Appl. No. 15/934,815, dated Feb. 1, 2019.
Supplemental Notice of Allowance from U.S. Appl. No. 16/355,534, dated Sep. 12, 2019.
Supplemental Notice of Allowance from U.S. Appl. No. 16/355,451, dated Sep. 18, 2019.
Supplemental Notice of Allowance from U.S. Appl. No. 16/355,415, dated Sep. 13, 2019.
Supplemental Notice of Allowance from U.S. Appl. No. 16/355,415, dated Aug. 16, 2019.
Supplemental Notice of Allowance from U.S. Appl. No. 16/355,451, dated Aug. 14, 2019.
Supplemental Notice of Allowance from U.S. Appl. No. 16/355,534, dated Aug. 21, 2019.
List of IBM Patents or Patent Applications Treated As Related.
Supplemental Notice of Allowance from U.S. Appl. No. 15/933,118, dated Mar. 7, 2019.
Supplemental Notice of Allowance from U.S. Appl. No. 15/934,815, dated Mar. 20, 2019.
Biskeborn R.G., U.S. Appl. No. 16/355,415, filed Mar. 15, 2019.
Biskeborn R.G., U.S. Appl. No. 16/355,451, filed Mar. 15, 2019.
Biskeborn R.G., U.S. Appl. No. 16/355,505, filed Mar. 15, 2019.
Biskeborn R.G., U.S. Appl. No. 16/355,534, filed Mar. 15, 2019.
Supplemental Notice of Allowance from U.S. Appl. No. 15/933,118, dated Apr. 26, 2019.
Supplemental Notice of Allowance from U.S. Appl. No. 15/934,815, dated Apr. 29, 2019.
Notice of Allowance from U.S. Appl. No. 16/355,451, dated May 31, 2019.
Non-Final Office Action from U.S. Appl. No. 16/355,505, dated Oct. 25, 2019.
Final Office Action from U.S. Appl. No. 16/355,505, dated Feb. 7, 2020.
Notice of Allowance from U.S. Appl. No. 16/355,505, dated Mar. 26, 2020.
Non-Final Office Action from U.S. Appl. No. 16/533,611, dated Mar. 30, 2020.
Non-Final Office Action from U.S. Appl. No. 16/533,595, dated Apr. 13, 2020.
Non-Final Office Action from U.S. Appl. No. 16/533,625, dated Apr. 13, 2020.
Supplemental Notice of Allowance from U.S. Appl. No. 16/355,505, dated Apr. 22, 2020.

* cited by examiner

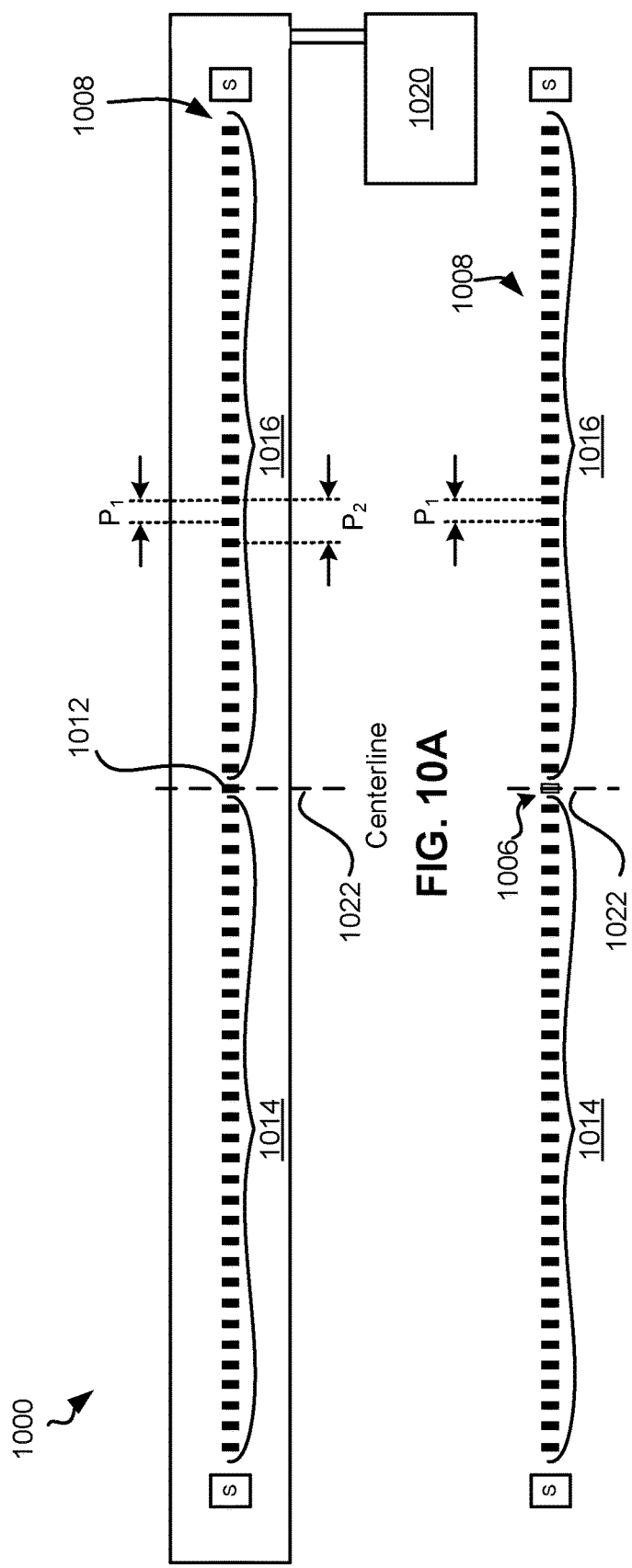
FIG. 10A
FIG. 10B
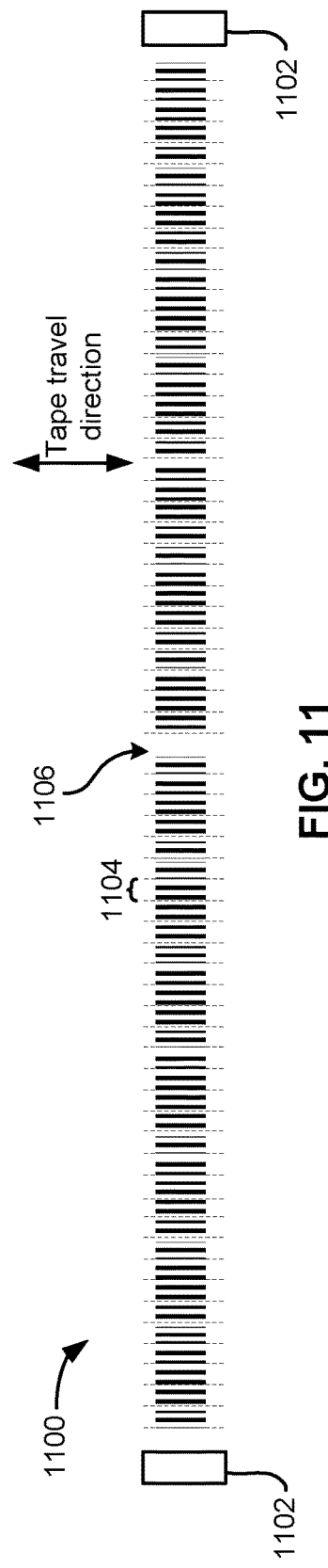
FIG. 11

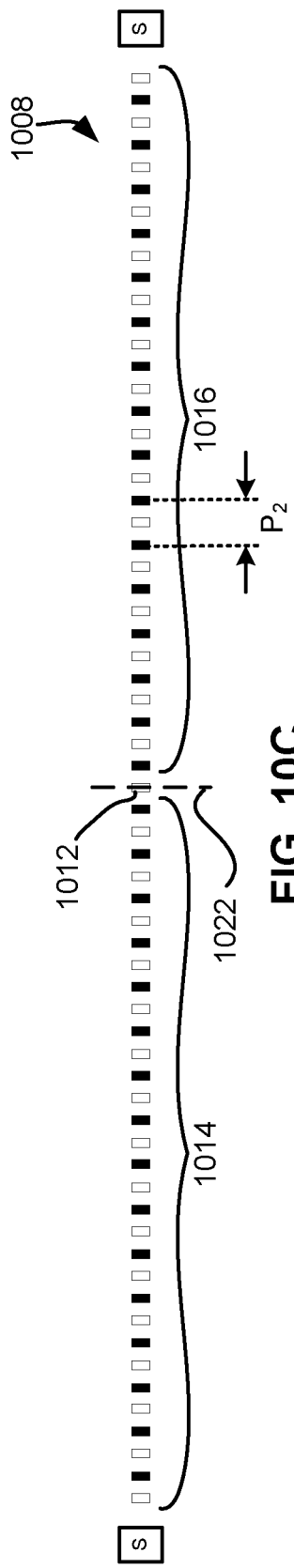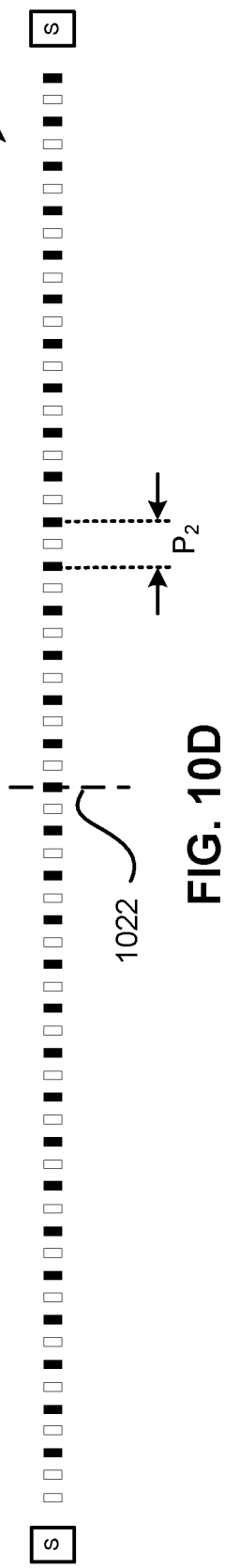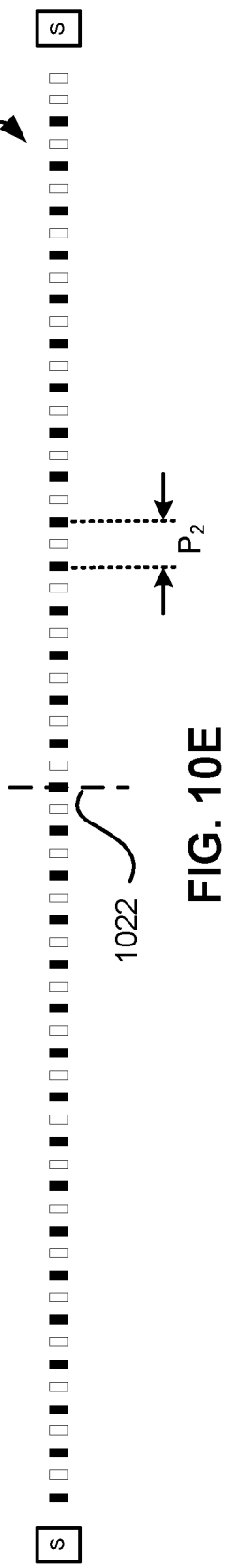

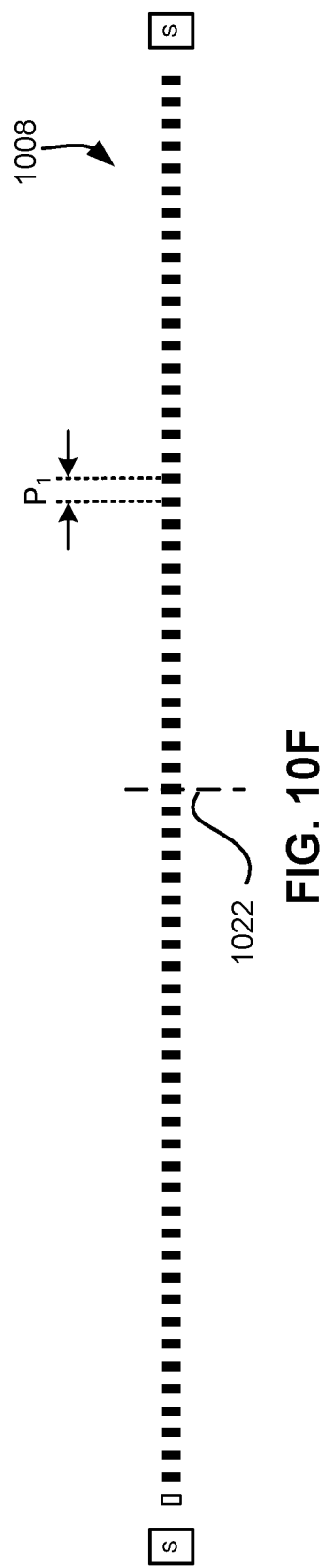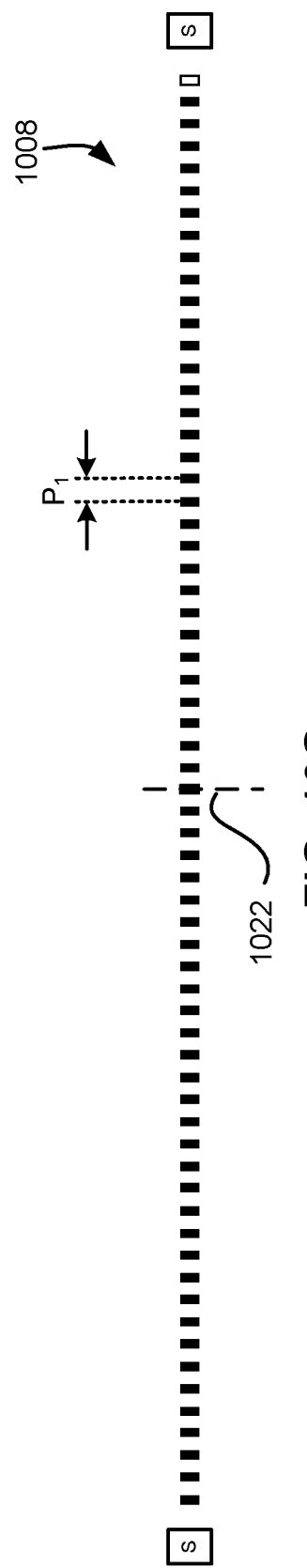

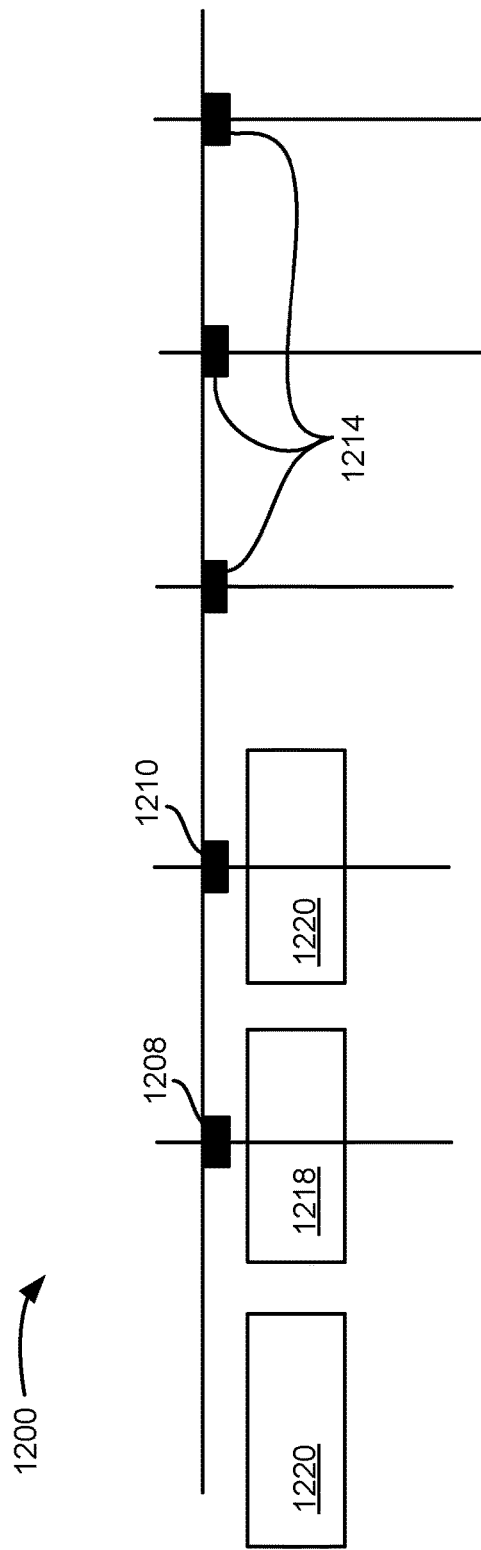
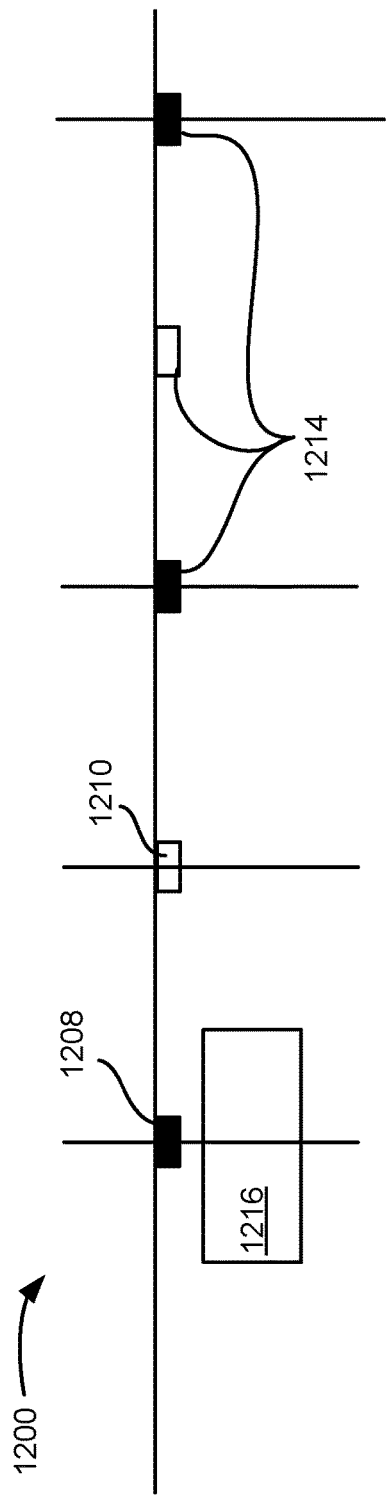
FIG. 12A
FIG. 12B

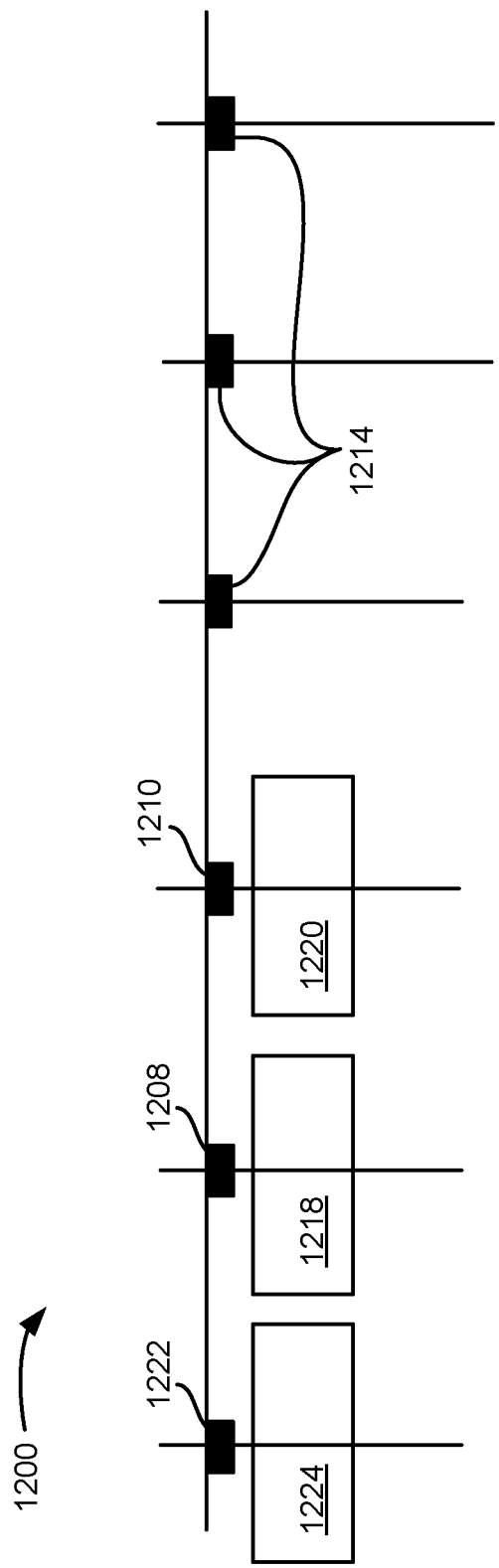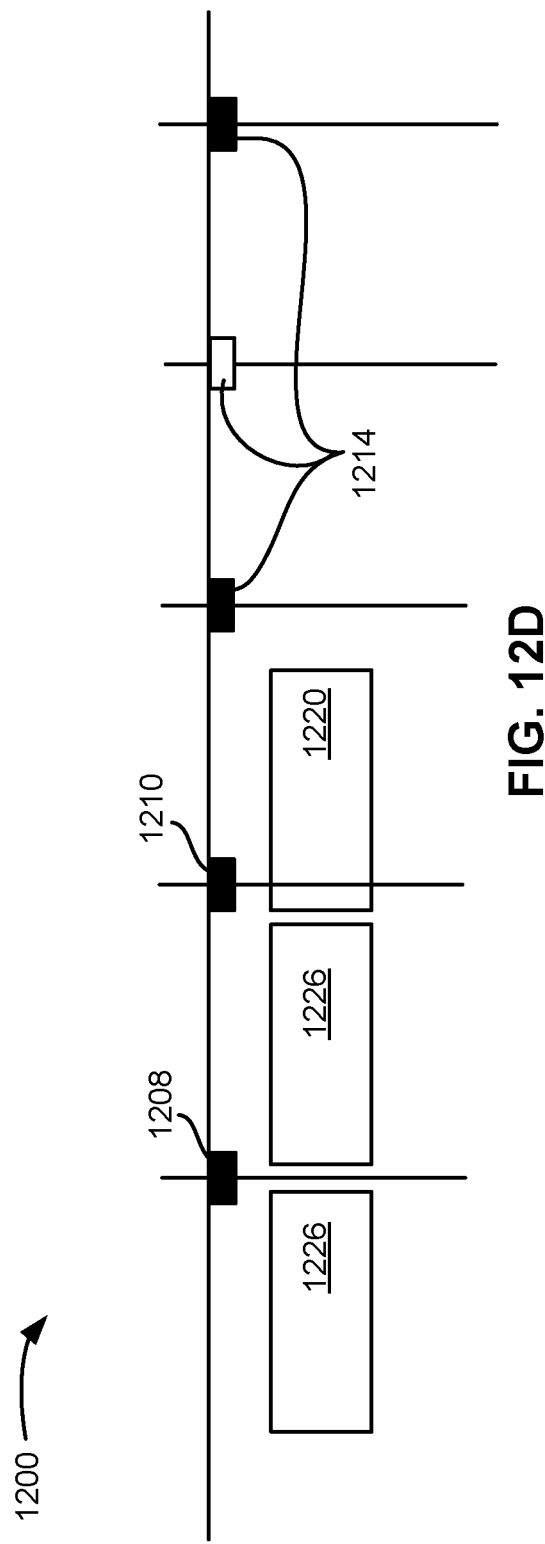

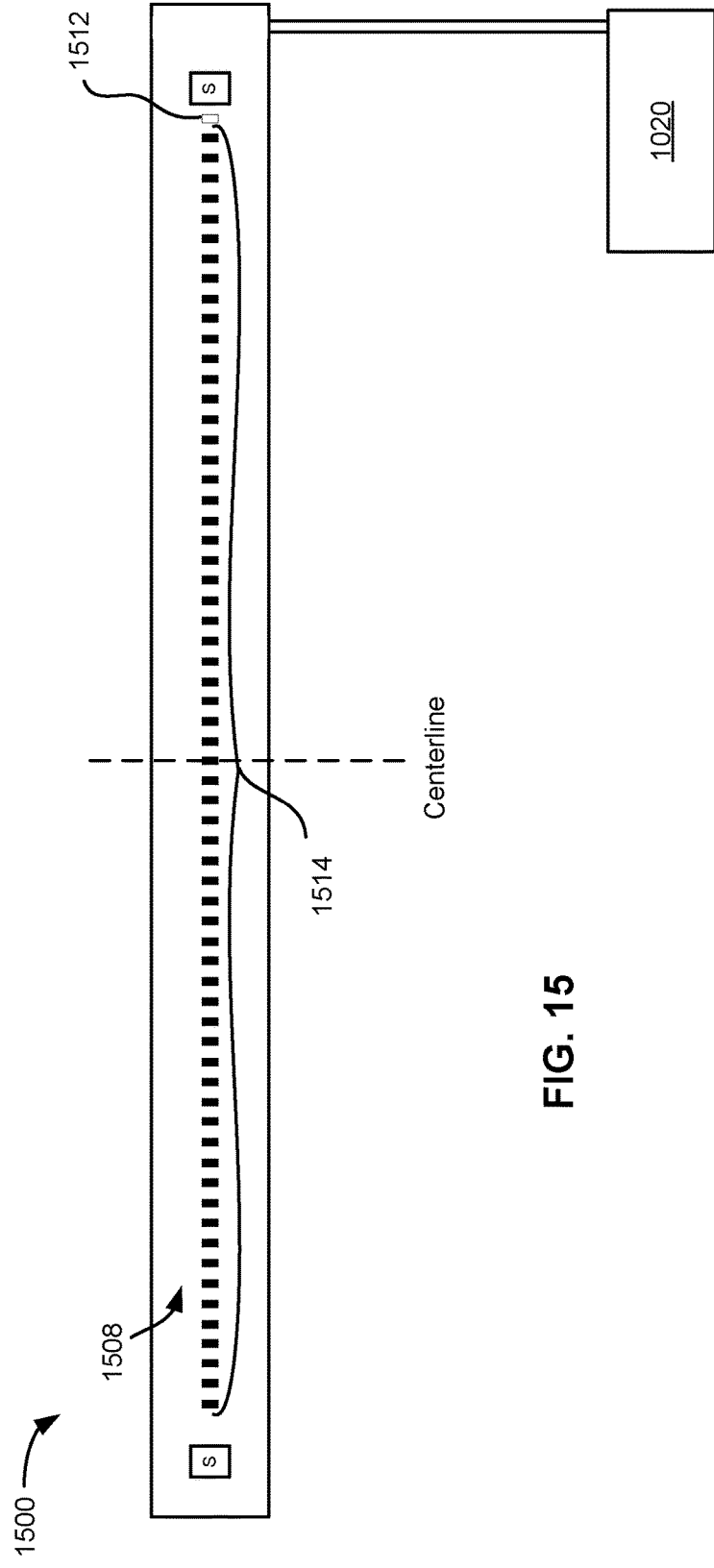
FIG. 14
FIG. 15

MULTI-MODE, MULTI-CHANNEL MAGNETIC RECORDING HEAD AND APPARATUS

BACKGROUND

The present invention relates to data storage systems, and more particularly, this invention relates to magnetic recording heads.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

An apparatus according to one embodiment includes an array of transducers, where the array of transducers includes at least one contiguous group of transducers in a number specified in a format and at least two servo readers, where the servo readers are symmetrically positioned about the contiguous group of transducers and the servo readers are asymmetrically positioned relative to a centerline of the array of transducers.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 10A is a representational view of an array of transducers, according to one embodiment.

FIGS. 10B-10G are representational views of active transducers within a larger array, according to various embodiments.

FIG. 11 is a partial representational view of a data band of a magnetic recording tape having spare area positioned centrally, according to one embodiment.

FIG. 12A is a representational view of a partial array of transducers according to one embodiment.

FIG. 12B is a representational view of a partial array of transducers according to one embodiment.

FIG. 12C is a representational view of a partial array of transducers according to one embodiment.

FIG. 12D is a representational view of a partial array of transducers according to one embodiment.

FIG. 14 is a partial representational view of a data band of a magnetic recording tape having spare area positioned proximate to a servo band, according to one embodiment.

FIG. 15 is a representational view of an array of transducers activated according to a format, according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes an array of equally-spaced 2N+1 transducers, and at least two servo readers positioned external to an outermost transducer of the array and on a same side thereof.

In another general embodiment, an apparatus includes an array of 2N+1 transducers on a pitch. At least one of the transducers within the array is configured as a servo reader.

In another general embodiment, an apparatus includes an array of transducers including an inner transducer and subarrays of the transducers positioned on opposite sides of the inner transducer. A controller is coupled to the transducers. The controller is configured to process data using only the transducers in the subarrays in a first mode of operation. The controller is also configured to process data using only a portion of the transducers in each of the subarrays in a second mode of operation. The inner transducer is inactive in the second mode of operation.

In another general embodiment, an apparatus includes an array of 2N+1 transducers, and a controller directly electrically coupled to each of the transducers. The controller is configured to use transducers on only one side of a centerline of the array in one mode of operation.

Figure 1A:
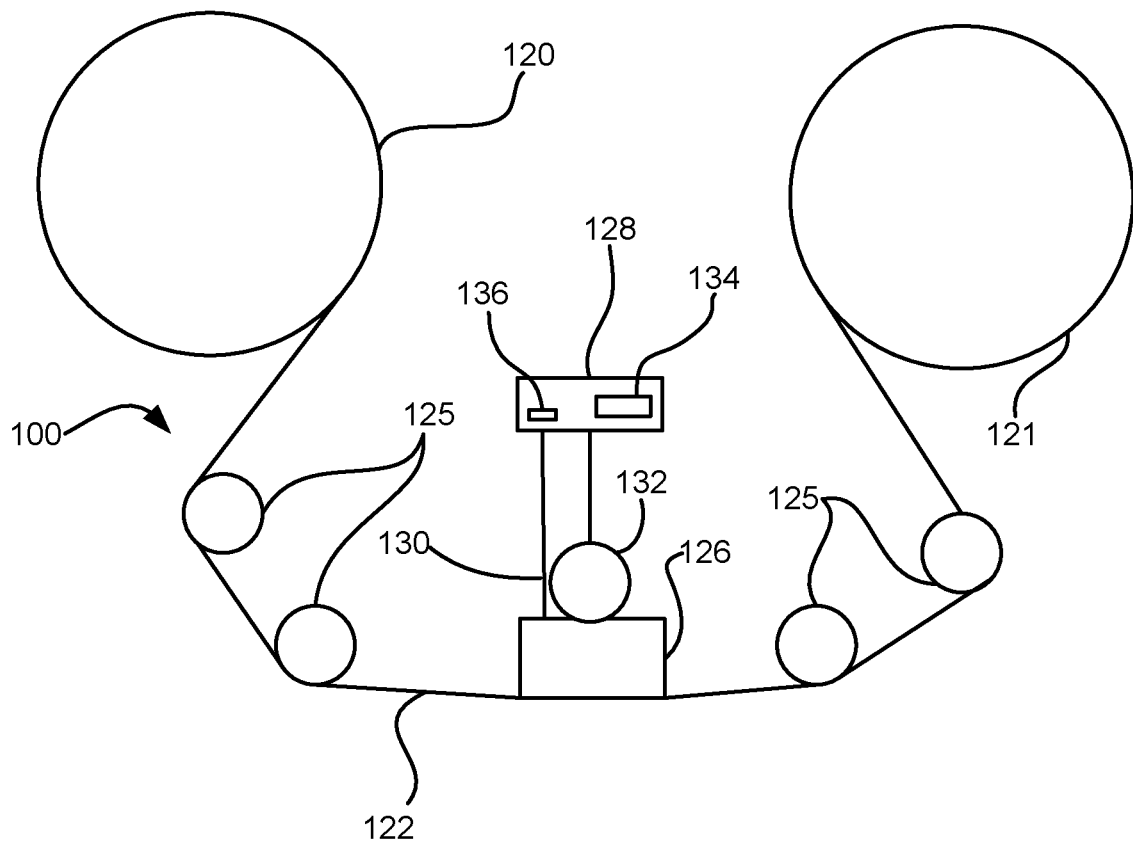
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
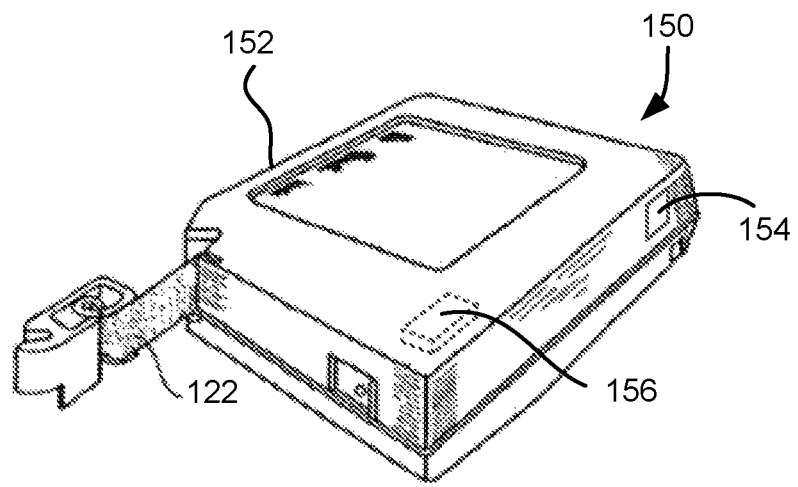
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or another device.

Figure 2A:
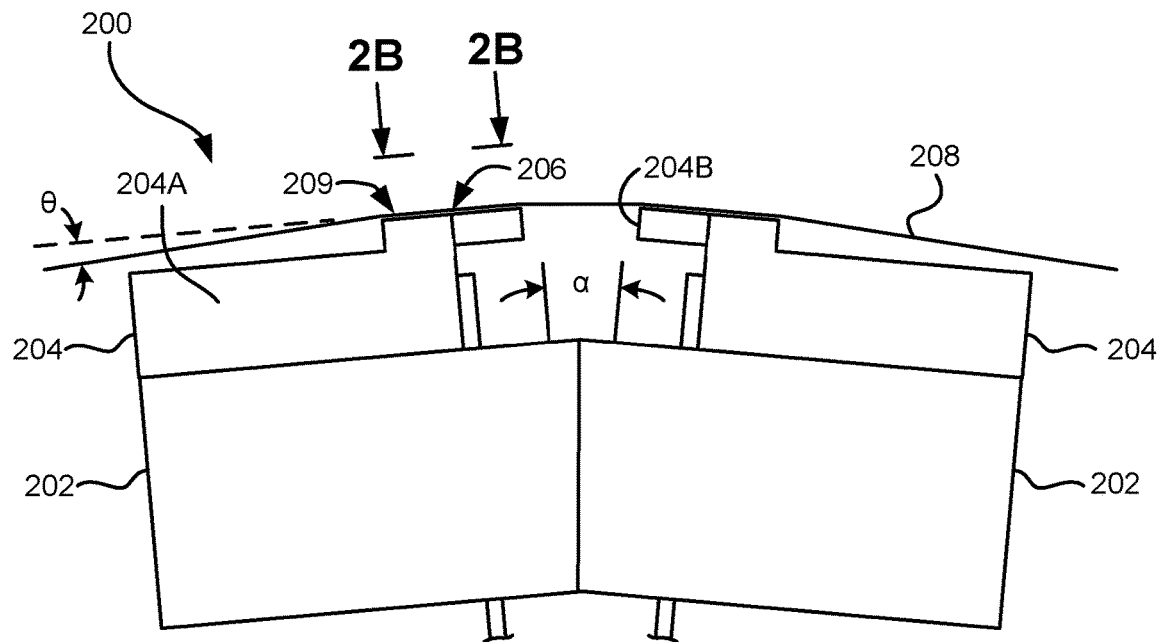
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
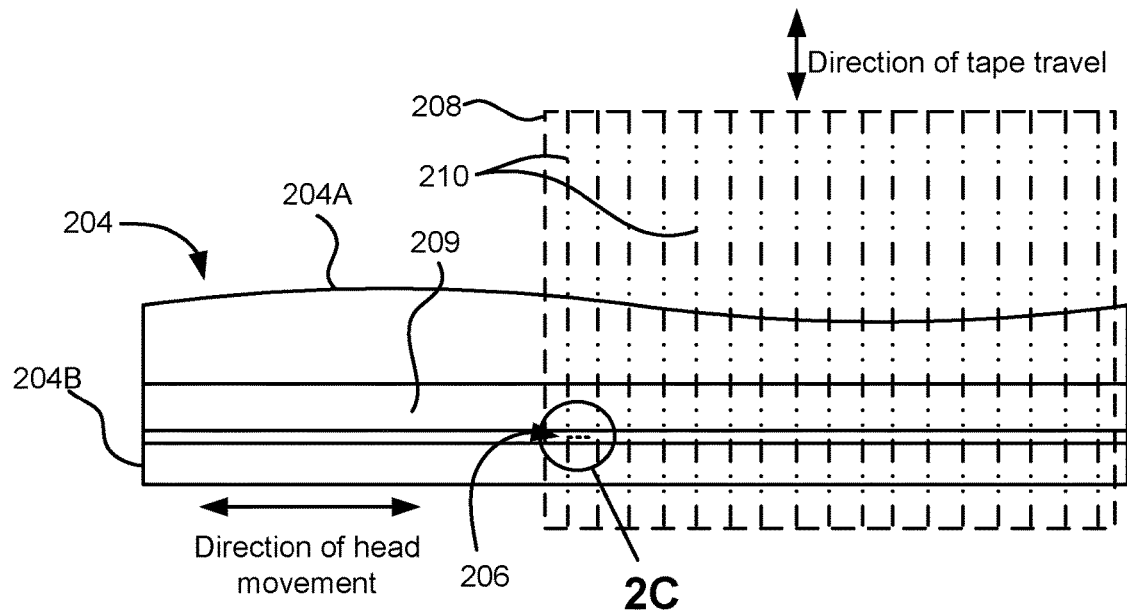
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
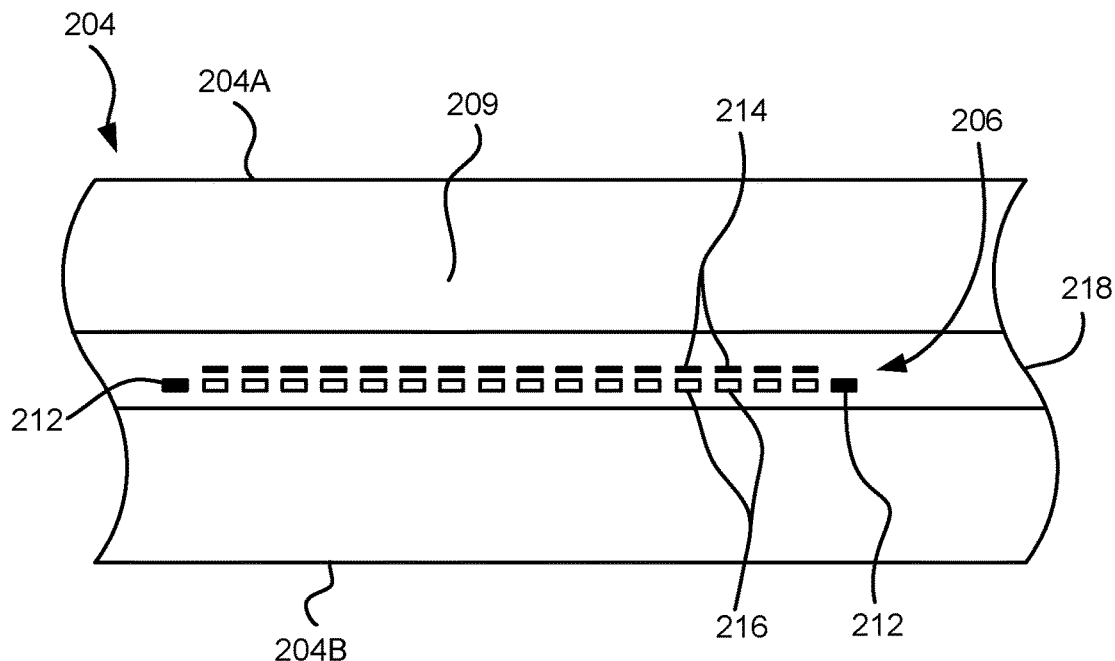
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
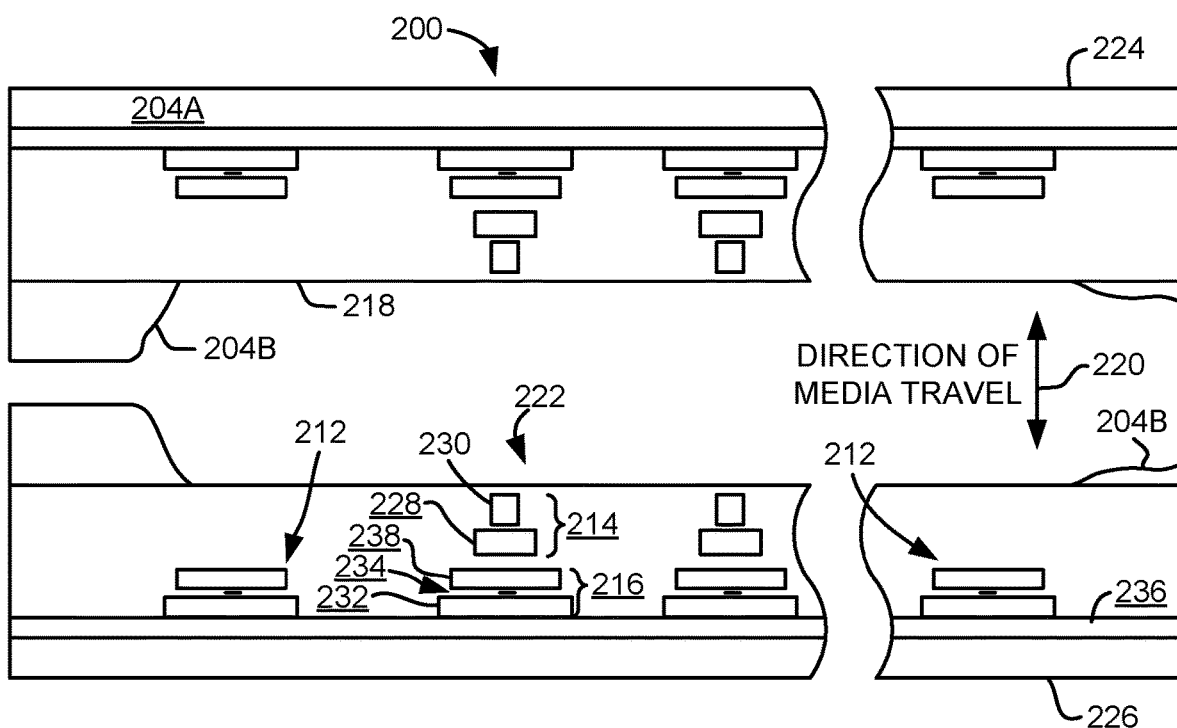
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
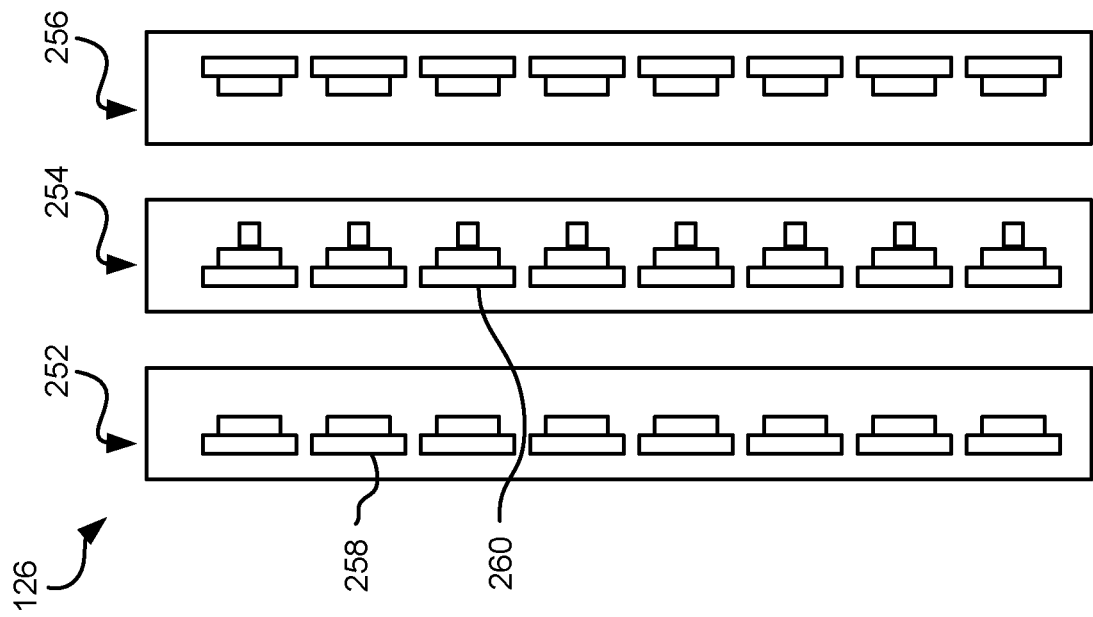
FIG. 4 is a partial tape bearing surface view of a magnetic head having a read-write-read configuration.
Figure 3:
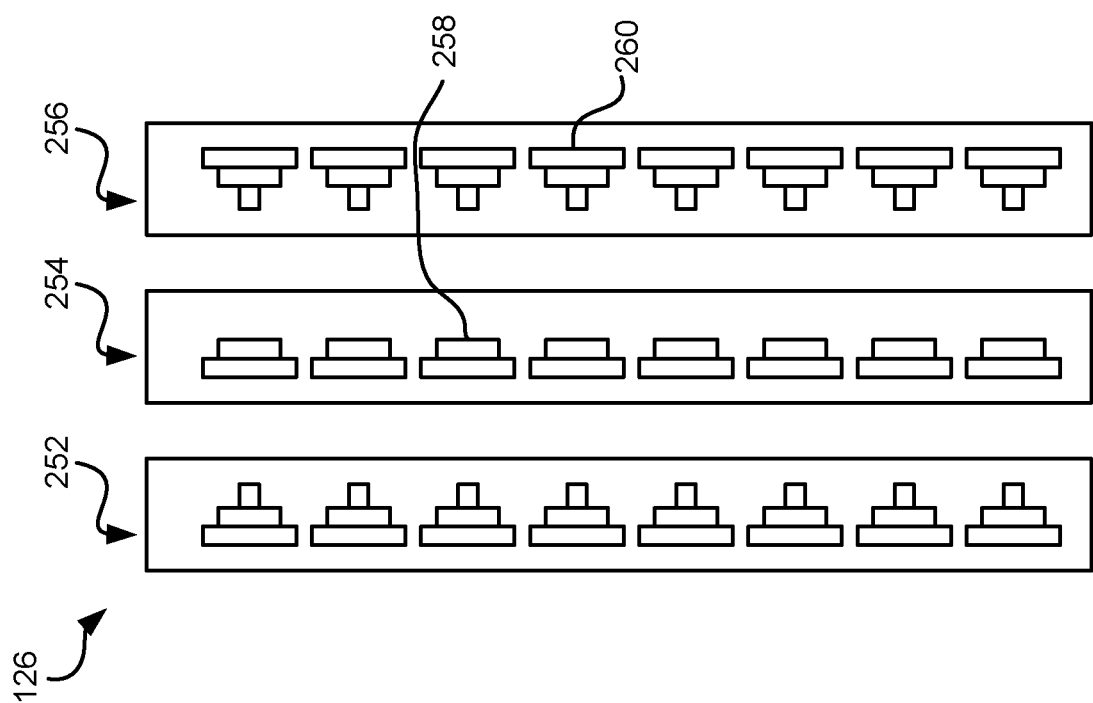
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
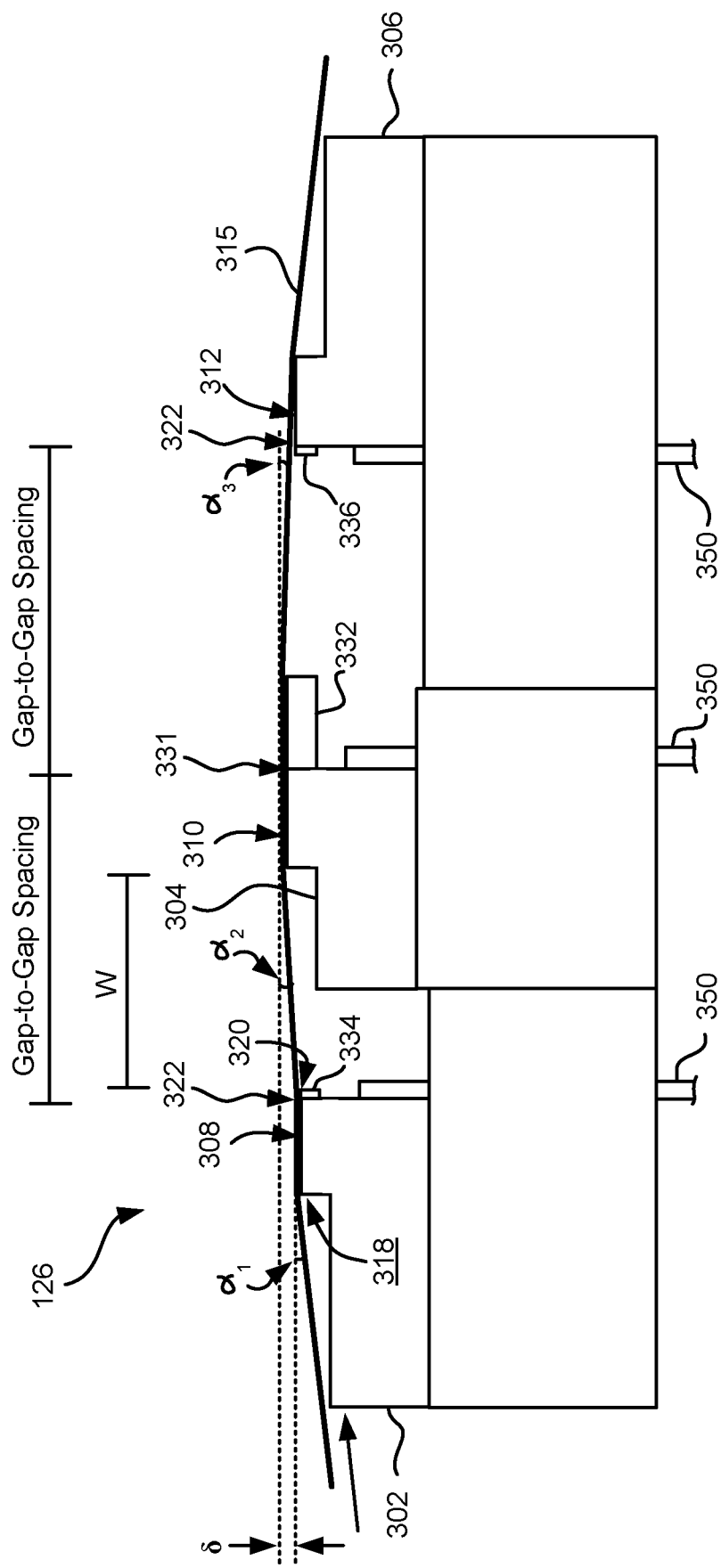
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also, note that the outer modules 302, 306 will alternate as leading modules, depending on the direction of travel of the tape 315.

Figure 6:
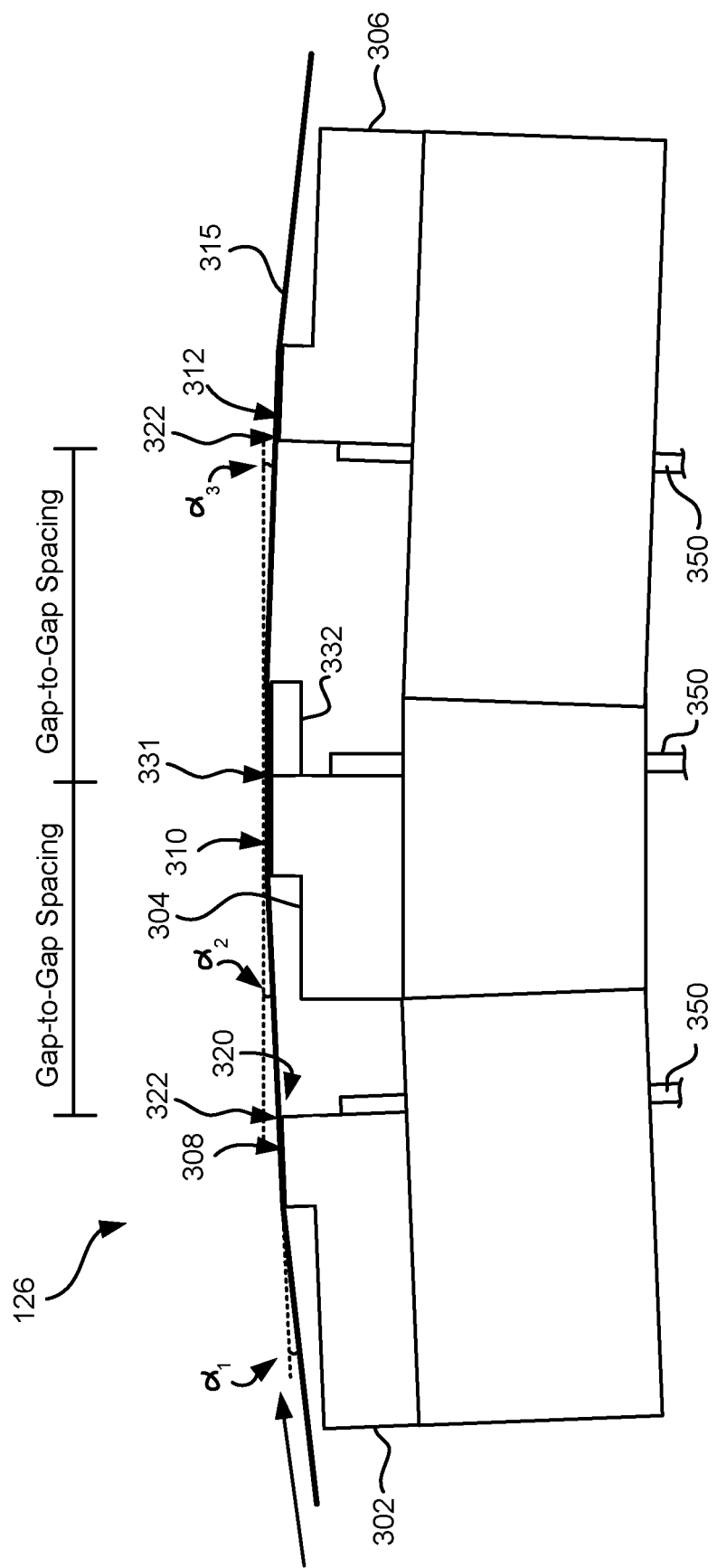
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used Liner Tape Open-(LTO)-compliant tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
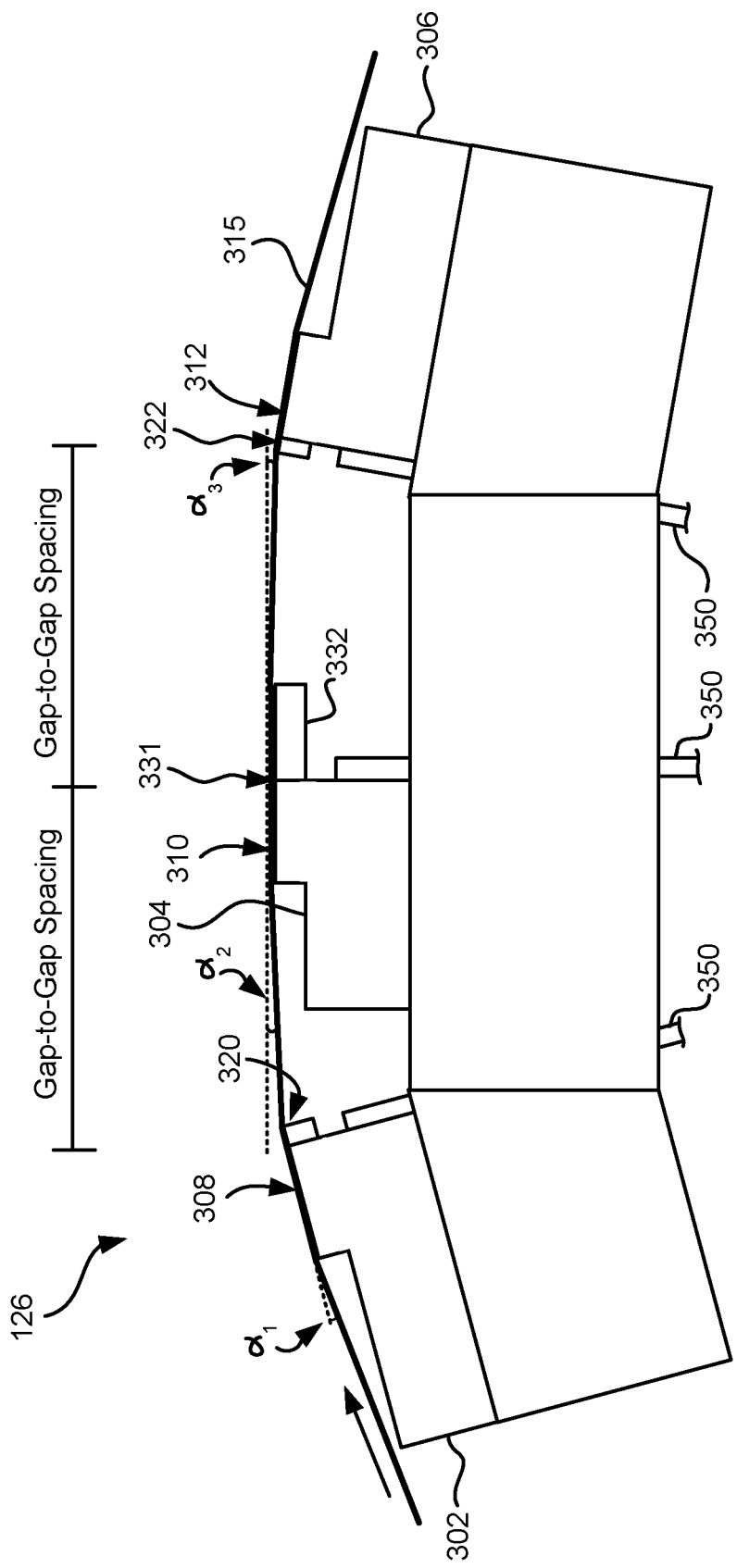
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
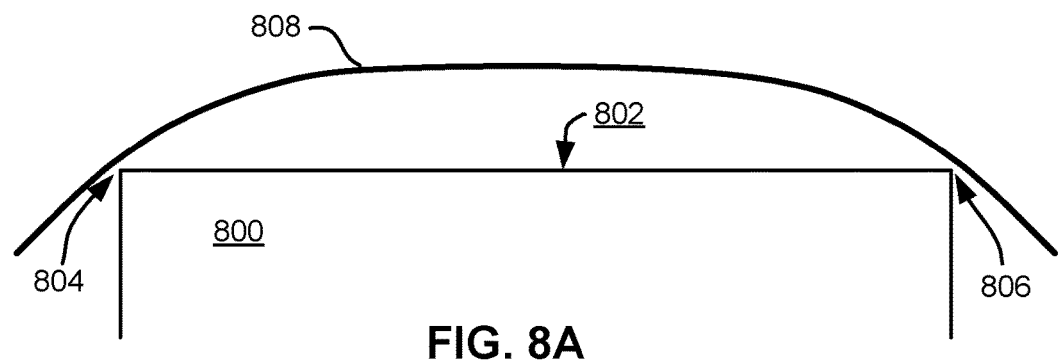
FIGS. 8A-8C are schematics depicting the principles of tape tenting.
Figure 8B:
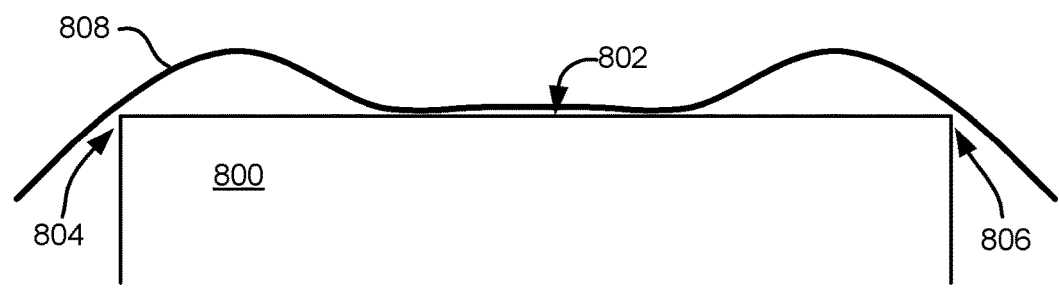
Figure 8C:
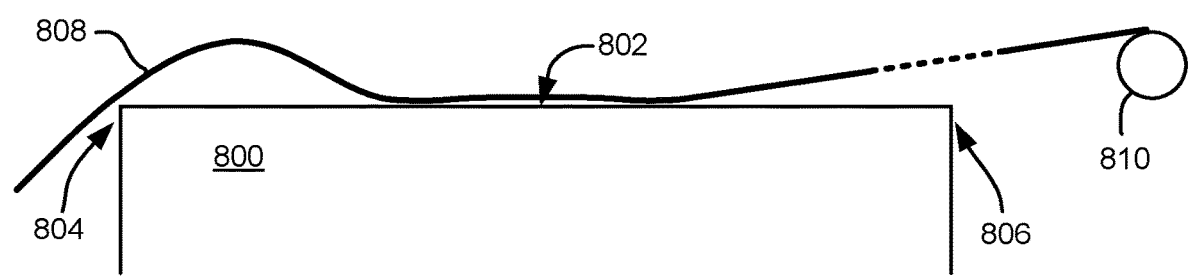

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
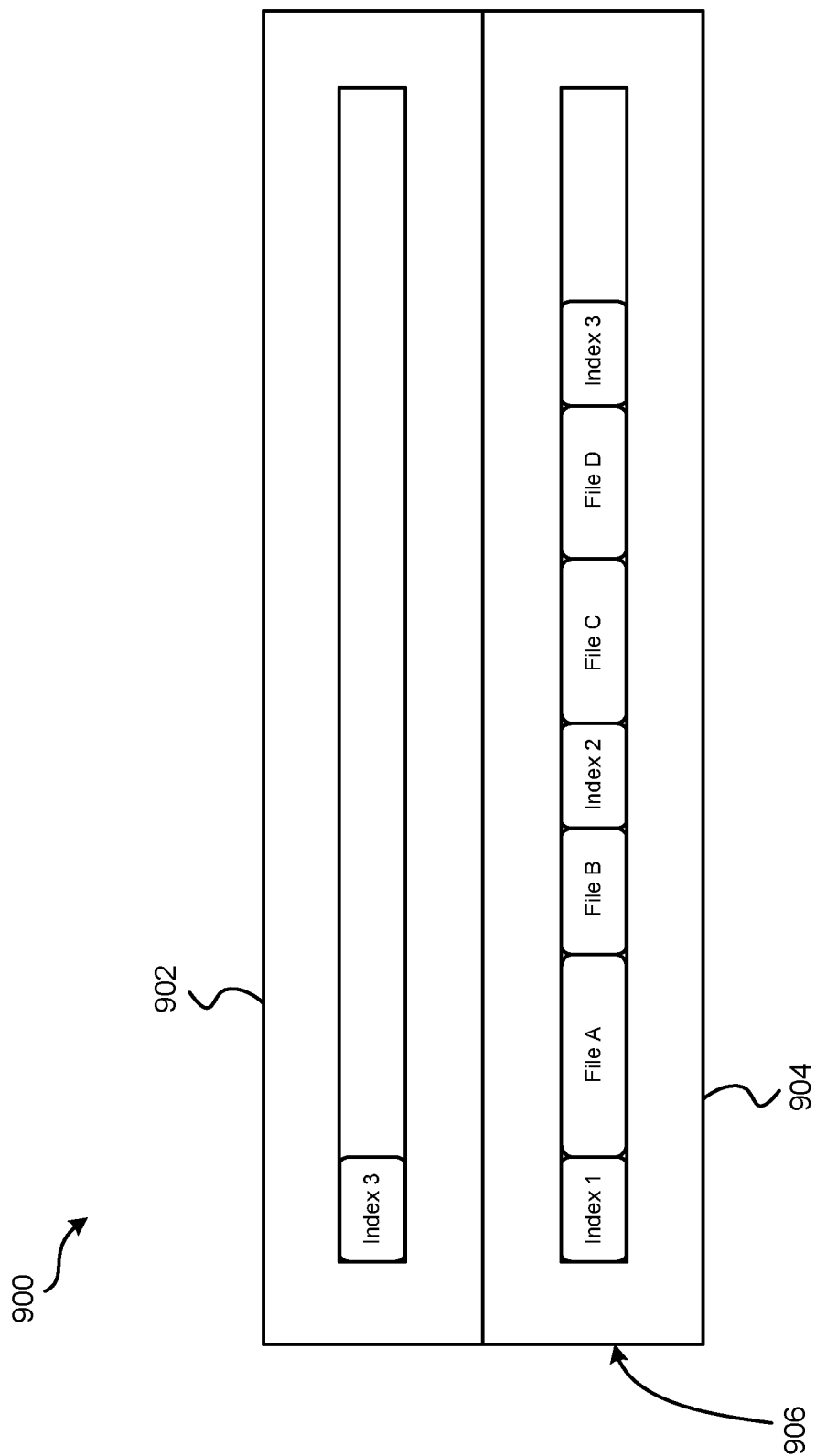
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 differently depending on the desired embodiment. According to some embodiments, the metadata of the index partition 902 may be updated in response to the tape being unmounted, e.g., such that the index may be read from the index partition when that tape is mounted again. The metadata may also be written in the data partition 902 so the tape may be mounted using the metadata recorded in the data partition 902, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As alluded to above, various embodiments are associated with a format for magnetic tape recording products and systems. Such format addresses the need for a configuration that enables higher data rate by allowing more active transducer channels in use per wrap, but at the same time provides backward compatibility to at least a previous generation having fewer active transducer channels in use per wrap.

Consider, for example, Linear Tape Open, $5^{th}$ generation (LTO-5), which is a 32 channel format that is backward compatible to LTO-2 and LTO-3, which are an 8 channel format and 16 channel format, respectively. LTO was created at the outset to accommodate both 8 and 16 channel formats, and thus enable a transition from 8 to 16 channels, and then to 32 channels. Continuing with this example, transitioning from LTO-5 to 64 channels and keeping backward compatibility means the pitch between channels needs to be halved again. This creates an asymmetry in the format, resulting in creation of spare area in a given data band.

"Spare area" may be defined, in some approaches, as area that is nonattainable for user data in the format being used, and is not a guard band positioned adjacent the servo tracks.

In various embodiments, the spare area created by doubling the number of channels in, for example, an LTO format is contiguous. In one approach, the spare area that is created is contiguous when, for example, the number of channels is doubled in a format wherein the number of active channels is modulo 4, 8, 16, 32, etc. A spare area is one where all the area not written to when a data band is fully written occupies one area of the tape, e.g., as a stripe along the length of the tape. This does not include guard bands adjacent the servo tracks. The spare area may be centered in the format, may be placed proximate to servo tracks, or at any point therebetween.

It would be desirable to improve density capability of a magnetic head designed to write and read a new high density format while maintaining backward write and/or read compatibility. Backward compatibility of magnetic tape heads to legacy formats is important to the end user of the tape drives. Various embodiments described herein enable backward compatibility to legacy formats and improve the density capability relative to the legacy format.

According to one embodiment, an apparatus includes an array of 2N+1 transducers, where "N" as used herein is an integer greater than zero. The transducers are preferably each individually addressable by the controller, e.g., by direct electrical connection between the controller and each transducer. Accordingly, the controller may include includes 2N+1 data channels, each of the data channels being directly electrically coupled to an associated one of the transducers e.g., via a cable. Thus, no multiplexer is used to select conductive paths to the transducers in particularly preferred embodiments.

In some embodiments, at least two servo readers are positioned external to an outermost transducer of the array and on a same side of the outermost transducer. FIG. 12A et seq., discussed below, depicts several potential embodiments having multiple servo readers on a side of the array of transducers.

Thus, in one embodiment, transducers in a single array are arranged to enable writing and/or reading both a new high density format as well as being able to toggle with backward compatibility for writing and/or reading a legacy format.

FIG. 10A depicts a representational view of a preferred embodiment of an apparatus 1000 in the form of an array of transducers of a magnetic head, not to scale, configured to read and/or write to a magnetic recording tape according to a format, in accordance with one embodiment. As an option, the present apparatus 1000 may be implemented in conjunction with features from any other embodiment listed herein, such as those described with reference to the other FIGS. Of course, however, such apparatus 1000 and others presented herein may be used in various applications and/or in permutations which may or may not be specifically described in the illustrative embodiments listed herein. Further, the apparatus 1000 presented herein may be used in any desired environment.

Referring to FIG. 10, an apparatus 1000 includes an array 1008 of 2N+1 transducers, which in this example includes 65 transducers, where different subsets of the transducers may be activated according to particular formats, e.g., 64 of the 65 transducers may be activated for 64 channel reading or writing. Servo readers S are also shown flanking the array 1008. The transducers in the array 1008 may be any type of transducers, such as readers, writers, piggyback reader/writer pairs, merged reader/writer pairs, etc. The servo readers S may include one servo reader on each side of the array, or multiple servo readers on one or both sides of the array, e.g., as shown in FIG. 12A.

According to one embodiment, the apparatus 1000 includes the array 1008 of transducers, arranged in a single array, including an inner transducer 1012 and subarrays of the transducers positioned on opposite sides of the inner transducer 1012. For example, as shown in FIG. 10B, according to a first mode of operation, the inner transducer 1012 is the middle transducer, which is inactive in the first mode of operation in some embodiments. The inactive transducer is depicted in FIG. 10B as having no fill. The subarrays 1014, 1016 include 32 active data transducers each (for a total of 64 active transducers) positioned symmetrically on opposite sides of the inactive inner transducer 1012 in the first mode of operation.

In many of the foregoing embodiments, the inner transducer 1012 is central and the subarrays 1014, 1016 are symmetrically arranged on opposite sides of the inner transducer 1012.

In other embodiments, the subarrays may have differing numbers of transducers relative to each other. For example, the location of the inactive transducer of FIG. 10B may be shifted to the left or right of the centerline, thereby creating asymmetrical arrays. Such location can be set by the controller 1020.

FIG. 11 depicts a partial view of a preferred embodiment of a product 1100 in the form of a magnetic recording tape written by transducers of the apparatus 1000 of FIG. 10A in the first mode of operation, as represented in FIG. 10B.

Referring to FIG. 11, there is shown a single data band and servo tracks 1102 defining the data band therebetween. The format preferably specifies modulo an even number, where "modulo" means "a multiple of", e.g., 2, 4, 8, 16, 32, 64, etc., of active channels and the example shown specifies a 64 channel reading and/or writing of data tracks 1104, and formation of spare area 1106 that is centered relative to the data tracks, and correspondingly, generally centered relative to the array of transducers that read and/or write the data tracks according to the format, in a direction perpendicular to the tape travel direction. This location of the spare area 1106 is due to the inactive inner transducer being located centrally in the array.

When the array 1008 of FIG. 10A is viewed in conjunction with the data band of FIG. 11, it is seen that the spare area 1106 is centered relative to the array of transducers. For simplicity, the term "spare area" on tape may correspond to the inactive region on the magnetic head. Thus, the array in FIG. 10A is logically divided into two symmetrical subarrays oriented about the inactive region (inner transducer 1012) at the centerline 1022 of the array. This symmetry has the advantage that the resultant format is symmetrical, which not only facilitates using the spare area for other functions if desired, but also greatly simplifies fabrication of the apparatus used for recording data in this format, and deployment of that apparatus in a manner that obviates a need for transducer multiplexing, etc.

Referring again to FIGS. 10B and 11, and the first mode of operation, the array 1008 may have an inactive region 1006 corresponding to the spare area 1106, and positioned between the symmetrical subarrays 1014, 1016. For example, the array may not have a transducer in the inactive region 1006. Alternatively, an inner transducer 1012 may be present, but is inactive, e.g., not coupled to a cable, damaged, or simply not activated during operation of the apparatus. The width of the inactive region 1006, may be approximately a single width of a data band relative to a single transducer. However, the resulting spare area on the tape has a width about equal to a sub-data band (e.g., adjacent tracks written by a single transducer or otherwise corresponding to the lateral range of one transducer position in the array). The sub-data band itself, when fully written, may be about equal to the center to center transducer pitch $P_1$. Preferably the center to center transducer pitch $P_1$ is the same across the array, i.e., the transducers are equally-spaced on a common pitch.

According to a second mode of operation as represented in FIG. 10C, alternating ones of the transducers in the array are activated, while the inner transducer 1012 is inactive. The inactive transducers are depicted in FIG. 10C as having no fill. Thus, the subarrays 1014, 1016 each include 16 active data transducers (for a total of 32 active transducers) positioned symmetrically on opposite sides of the inactive inner transducer 1012 in the second mode of operation. The 32 active transducers in the single array may correspond to a legacy format, e.g., one having a track pitch that is twice as wide as a modern format.

As shown in FIG. 10A the apparatus also includes a controller 1020 (see also FIG. 1A, controller 128) coupled to the array 1008 of transducers. The controller may be configured to 1020 determine which mode to use, e.g., based on data on the tape cartridge, information from a database, etc. In response thereto, the controller 1020 may be configured to activate at least the appropriate transducers and associated data channels, e.g., as specified by firmware or other logic stored in the controller. For example, the controller 1020 may be configured to process data (e.g., read or write from the medium) using only the transducers in the subarrays 1014, 1016 in a first mode of operation and not the inner transducer 1012. In addition, the controller may be configured to process data using only a portion of the transducers in each of the subarrays in a second mode of operation, not using the inner transducer 1012 as in FIG. 10C, or using the inner transducer, e.g., as in FIGS. 10D and 10E, where the inner transducer 1012 may be active, and a pair of outer transducers on the far end of the array may be inactive (see FIGS. 10D and 10E). The inactive transducers are depicted in FIGS. 10D and 10E as having no fill. For example, the modes depicted in FIGS. 10D and 10E may be used together, where the mode depicted in FIG. 10D may be used for tape travel in one direction, and the mode depicted in FIG. 10E may be used when the tape travels in the other direction. Such embodiment may enable backward compatibility with existing formats.

Various modes of operation are contemplated, and any subset of transducers may be selected for a given mode of operation in various embodiments. For example, all of the data channels, and thus all transducers, may be active in one mode of operation. In another approach, the controller may be configured to activate data channels thereof depending on a tape motion direction.

In one exemplary mode of operation, the modes depicted in FIGS. 10F and 10G may be used together, where the mode depicted in FIG. 10F may be used for tape travel in one direction, and the mode depicted in FIG. 10G may be used when the tape travels in the other direction.

In another example of possible modes of operation, an apparatus having an array of 2N+1 transducers and controller directly electrically coupled to each of the transducers is configured to use transducers on only one side of a centerline of the array in one mode of operation. This may be beneficial because the data elements span approximately half of the data band, and are therefore less subject to misalignment between head and tape due to tape lateral dimensional instability. The controller may be configured to use transducers on the other side of a centerline of the array in a second mode of operation within the same data band. The first and second modes may be performed consecutively to, for example, write the entire data band or read the entire data band.

Referring again to FIG. 10A, in various embodiments, a pitch $P_2$ between the active transducers in the second mode of operation may be an integral multiple of a pitch $P_1$ between the active transducers in the first mode of operation. In a preferred embodiment, the pitch $P_1$ between the active transducers in the first mode of operation may be one half of the pitch $P_2$ between the transducers in the second mode of operation, for example, $P_1$ may be one half the pitch of a legacy pitch.

Looking again to FIG. 11, in one embodiment, the apparatus 1000 may be configured to read from and/or write to a magnetic recording tape of a product 1100 (e.g., tape cartridge) according to a first format, where the first format may specify a number of active channels, locations of data tracks 1104 on the magnetic recording tape, and spare area 1106 on the magnetic recording tape. Furthermore, the first format may also specify backward compatibility with a second format, where the second format may specify a smaller number of active channels (see e.g., FIGS. 10C-10E) than the number of active channels specified by the first format (see e.g., FIG. 10B).

In some embodiments of apparatus 1000 where the inner transducer 1012 is not used for data operations, the inner transducer 1012 may be used as a servo reader to read a servo track for greater positioning accuracy.

In further embodiments, one or more of the transducers within the array is configured as a servo reader, e.g., of conventional design. The transducer configured as the servo reader may be positioned anywhere in the array. In one approach, such transducer is flanked by an equal number of N transducers on each side thereof.

FIGS. 12A-12E are partial representations of various embodiments of an apparatus 1200, not to scale, configured to read and/or write to magnetic recording tapes, in accordance with one embodiment. As an option, the apparatus 1200 may be implemented in conjunction with features from any other embodiment listed herein, such as those described with reference to the other FIGS. Of course, however, such apparatus 1200 and others presented herein may be used in various applications and/or in permutations which may or may not be specifically described in the illustrative embodiments listed herein. Further, the apparatus 1200 presented herein may be used in any desired environment.

In the partial representations of apparatus 1200 in FIGS. 12A-12B, a far end portion of the array of transducers of apparatus 1200 is shown, with two servo readers positioned external to an outermost transducer of the array and on a same side thereof. While the apparatus 1200 may be any configuration of components consistent with the descriptions herein, assume by way of example only that the apparatus 1200 has a similar construction as apparatus 1000 of FIG. 10A, and is configured to operate in the first and second modes of operation represented in FIGS. 10B and 10C. As shown in FIGS. 12A-12B, the servo reading portion may have two servo readers 1208, 1210.

Referring to FIG. 12A, in the first mode of operation, both servo readers 1208, 1210 are active, as well as the adjacent data transducers 1214. The servo readers 1208, 1210 may be configured to read a first servo track 1218 and second and third servo tracks 1220, where the various servo tracks may be of any type. The first and second servo tracks can be any combination of servo tracks, such as both timing based servo tracks, one timing based and one HD servo track, etc.

The servo readers 1208, 1210 may be identical, or may be different. For example, the servo readers 1208, 1210 may have different track widths.

Referring to FIG. 12B, in the second mode of operation, the apparatus 1200 uses 32 active transducers 1214 (of which only one active and two inactive transducers are shown for simplicity) and only one servo reader 1208 to read a servo track 1216 corresponding to the legacy format, for example, a conventional legacy 32 channel format. In various approaches, the second mode of operation may use one or more of the servo readers for conventional servo tracks and/or high density servo tracks (not shown). The inactive transducers and servo reader are depicted in FIG. 12B as having no fill.

In some embodiments, the apparatus 1000 may be configured to use one or both of the servo readers 1208, 1210 to read a servo track or tracks as described in U.S. Pat. No. 5,689,384, which is herein incorporated by reference.

In yet other embodiments, the servo reading portion may include three or four servo readers for reading multiple servo tracks according to different formats. FIG. 12C depicts an embodiment having three servo readers 1208, 1210, 1222 for reading three servo tracks 1218, 1220, 1224.

FIG. 12D depicts an embodiment having two servo readers 1208, 1210 on one side of the array for reading three servo tracks 1220, 1226, where, for example, servo track 1220 may be a high density pattern, while servo tracks 1226 are timing based servo tracks having a format designed for a 32 channel mode of operation. In one approach, the servo tracks 1226 are approximately half the width and have a steeper chevron angle than a conventional servo track.

The servo tracks read by the plurality of servo readers can be any combination of servo tracks, such as one or more timing based servo tracks, one or more HD servo track, etc. and combinations thereof.

The servo readers 1208, 1210 may be identical, or may be different. For example, the servo readers 1208, 1210 may have different track widths. Moreover, the center to center spacing between adjacent servo readers may be the same or different.

Figures 12E, 12F:
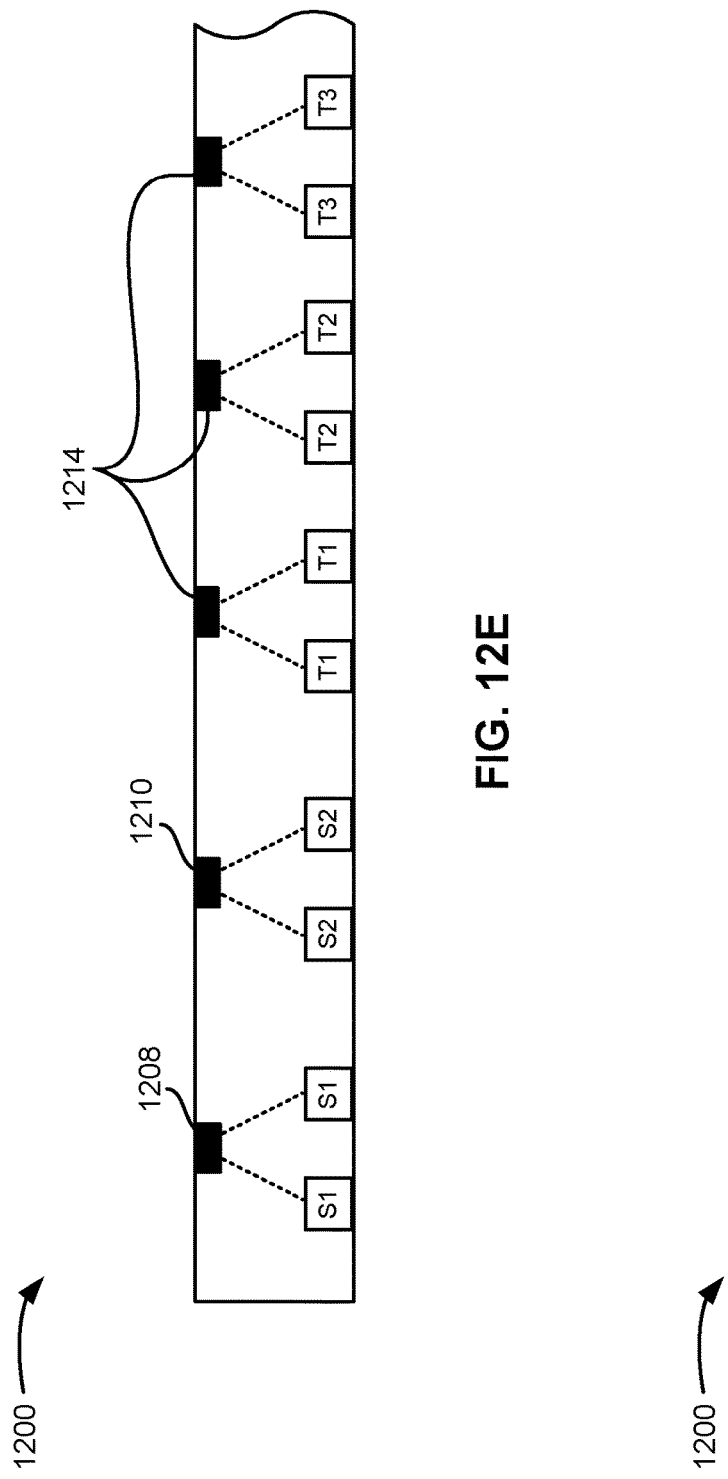
FIG. 12E is a representational view of a partial array of transducers according to one embodiment.
FIG. 12F is a representational view of a partial array of transducers according to one embodiment.

In some embodiments, e.g., as depicted in FIG. 12E, the transducers 1214 and servo readers 1208, 1210 are on a module (e.g., as in FIGS. 2A-7), where each of the transducers and servo readers are coupled to an associated pair of connection pads S1, S2, T1, T2, T3 of the module. The connection pads may in turn be coupled to the controller via a flex circuit (e.g., cable). Referring again to FIG. 12A, noise from fields coupling into the leads of the servo reader 1220 positioned closest to the transducers 1214 may be an issue, especially where the transducers 1214 are writers and the servo channel for servo reader 1220 is sensitive to noise. If the servo channel for the other servo reader 1208 is less sensitive to noise, the relative positions of the pairs of connection pads S1, S2 coupled to the servo readers 1208, 1210 may be transposed from relative positions of the servo readers on the module, as represented in FIG. 12F. Accordingly, in the cable, the leads coupled to servo reader 1210 are positioned farther from the leads coupled to the nearest transducer 1215 than they would be if configured as in FIG. 12E.

Any of these embodiments may be implemented in a magnetic data storage system such as a tape drive system, which may include a magnetic head, a drive mechanism for passing a magnetic medium (e.g., recording tape) over the array of transducers of a magnetic head, and a controller electrically coupled to the array of transducers of a magnetic head.

Figure 13A:
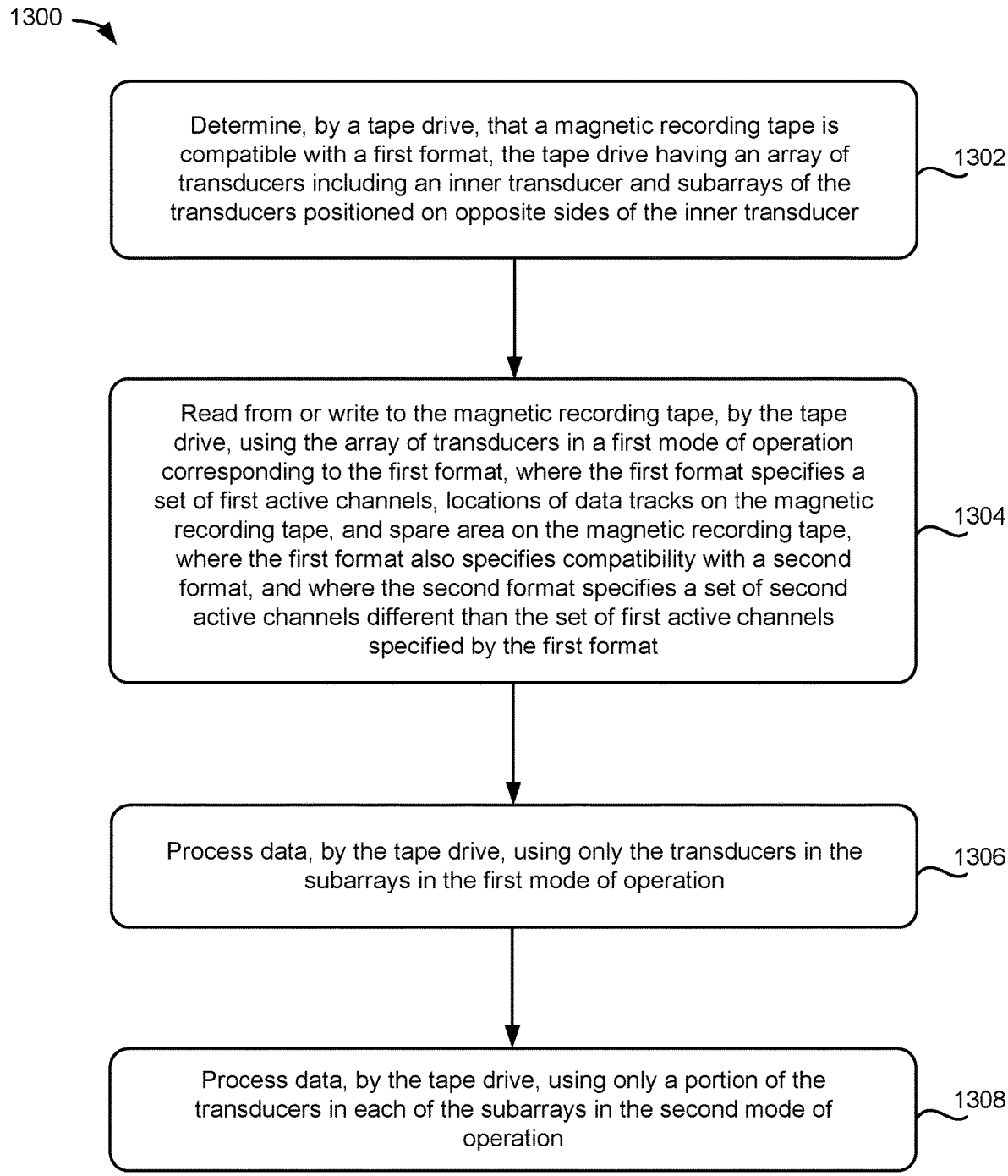
FIG. 13A is a flow diagram of a method according to one embodiment.

FIG. 13A depicts a drive-implemented method 1300 for writing and/or reading a first format and a second format in an apparatus, in accordance with one embodiment. As an option, the method 1300 may be implemented in conjunction with features from any other embodiment listed herein, such as those described with reference to the other FIGS. Of course, however, such method 1300 and others presented herein may be used in various applications and/or in permutations which may or may not be specifically described in the illustrative embodiments listed herein. Further, the method 1300 presented herein may be used in any desired environment.

According to one embodiment as illustrated in the flow chart diagram in FIG. 13, a drive-implemented method 1300 begins with operation 1302 that includes determining, by the tape drive, that a magnetic recording tape is compatible with a first format. The tape drive may have an array of transducers including an inner transducer and subarrays of the transducers positioned on opposite sides of the inner transducer.

Operation 1304 of method 1300 includes reading from or writing to the magnetic recording tape, by the tape drive, using the array of transducers in a first mode of operation corresponding to the first format. The first format may specify a set of first active channels, locations of data tracks on the magnetic recording tape, and spare area on the magnetic recording tape. Moreover, the first format may also specify compatibility with a second format, e.g., backward compatibility with a legacy format. The second format may specify a set of second active channels different than the set of first active channels specified by the first format.

Operation 1306 of method 1300 includes processing data (e.g., reading or writing from the medium), by the tape drive, using only the transducers in the subarrays in the first mode of operation and not the inner transducer.

When a tape configured in the second format is operated on by the tepa drive, operation 1308 is performed. Operation 1308 of method 1300 includes processing data, by the tape drive, using only a portion of the transducers in each of the subarrays in the second mode of operation and not the inner transducer. In other embodiments, operation 1308 includes processing data, by the tape drive, using the inner transducer and only a portion of the transducers in each of the subarrays in the second mode of operation.

In one embodiment, an apparatus includes an array of transducers, where a total number of the transducers in the array is greater than a number of transducers specified for a format for which the array of transducers is designed. The apparatus also includes at least two servo readers positioned together external to an outermost transducer of the array and optionally at least another servo reader on the other end of the array. The at least two servo readers may include servo readers to read a high-density servo pattern and/or a timing-based servo pattern, for example.

Figure 13B:
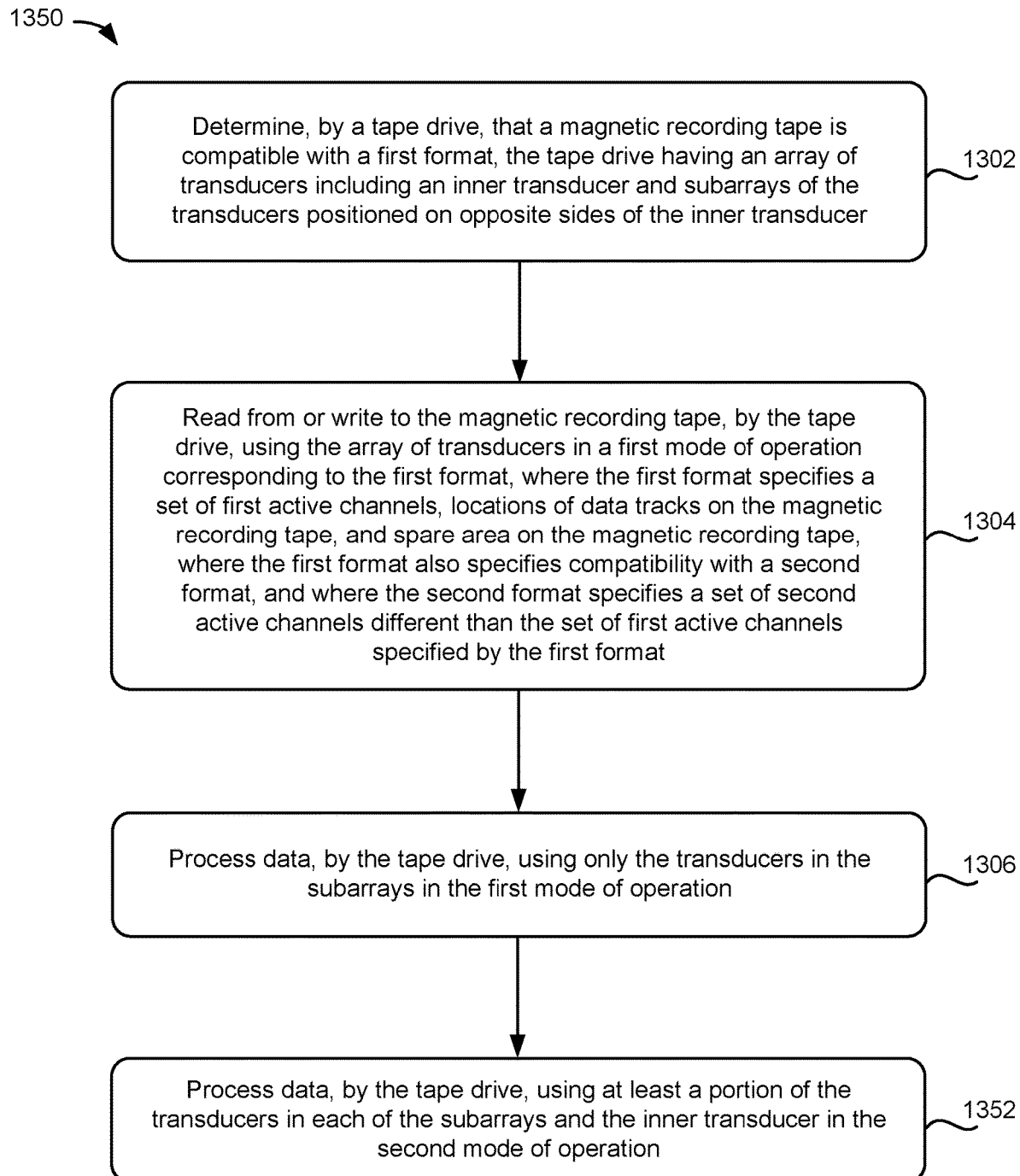
FIG. 13B is a flow diagram of a method according to one embodiment.

FIG. 13B depicts a drive-implemented method 1350 for writing and/or reading a first format and a second format in an apparatus, in accordance with one embodiment. As an option, the method 1350 may be implemented in conjunction with features from any other embodiment listed herein, such as those described with reference to the other FIGS. Of course, however, such method 1350 and others presented herein may be used in various applications and/or in permutations which may or may not be specifically described in the illustrative embodiments listed herein. Further, the method 1350 presented herein may be used in any desired environment.

Method 1350 includes operations 1302-1306 of FIG. 13A. Operation 1352 of method 1350 includes processing data using at least a portion of the transducers in each of the subarrays and the inner transducer in the second mode of operation.

FIG. 14 depicts a partial view of another embodiment of a product 1400 having a magnetic recording tape, in accordance with one embodiment. As an option, the present product 1400 may be implemented in conjunction with features from any other embodiment listed herein, such as those described with reference to the other FIGS. For example, the product 1400 may be embodied as a cartridge, such as that shown in FIG. 1A, and having a cartridge memory with data therein specifying the format. Of course, however, such product 1400 and others presented herein may be used in various applications and/or in permutations which may or may not be specifically described in the illustrative embodiments listed herein. Further, the product 1400 presented herein may be used in any desired environment.

Referring to FIG. 14, various embodiments of product 1400 include a data band 1408 and servo tracks 1002 defining the data band therebetween. The format of the written tracks preferably specifies modulo an even number, e.g., 2, 4, 8, 16, 32, 64, etc., of simultaneously read or written data tracks, and the example shown specifies a 64 channel reading and/or writing of data tracks 1004, and formation of spare area 1406 that is proximate to one of the servo tracks 1002, and correspondingly, the servo tracks 1002 may be centered relative to the contiguous group of data tracks according to the format, in a direction perpendicular to the tape travel direction. See, e.g., the array in FIG. 15.

FIG. 15 depicts a representational view of an embodiment of an apparatus 1500 having an array of transducers, not to scale, configured to read and/or write to a magnetic recording tape according to a format, and a controller 1020. As an option, the present apparatus 1500 may be implemented in conjunction with features from any other embodiment listed herein, such as those described with reference to the other FIGS. Of course, however, such apparatus 1500 and others presented herein may be used in various applications and/or in permutations which may or may not be specifically described in the illustrative embodiments listed herein. Further, the apparatus 1500 presented herein may be used in any desired environment.

The apparatus 1500 includes an array 1508 of transducers, for example, 65 transducers as shown, that may include at least one contiguous group 1514 of 64 active data transducers and at least two servo readers S. The servo readers S may be symmetrically positioned about the contiguous group 1514 of transducers, and thus are asymmetrically positioned relative to a Centerline of the array of transducers. Consequently, the centerline of the servo readers S is located at the center of the contiguous group 1514 of active transducers and not the Centerline of the entire array 1508. For example, as illustrated in FIG. 15, the end transducer 1512 may be inactive in the array 1508 (e.g. 65 transducers become 64 active transducers, 33 transducers become 32 active transducers, etc.). Thus, the written tracks may be centered in the data band, as illustrated in FIG. 14, thereby creating the spare areas 1406 of the data band 1408.

Furthermore, according to another embodiment, the apparatus 1500 has backward capability to read and/or write a legacy format including 32 active channels toggling format which may use, for example, either the left-most 32 or right-most 32 of 33 channels centered in the array for writing and reading the 32 channels.

In a further embodiment, an apparatus includes an array of 2N+1 transducers, and a controller electrically coupled only to transducers in odd positions e.g., the N+1, or equivalently the N positions, in the array. For example, a controller may only be able to communicate with 32 or 33 of the 65 transducers of the array of apparatus 1000 of FIG. 10A. The controller has no electrical connection to the other transducers.

It will be clear that the various features of the foregoing systems and/or methodologies may be combined in any way, creating a plurality of combinations from the descriptions presented above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
    an array of transducers, wherein the array of transducers comprises at least one contiguous group of transducers in a number specified in a format; and
    at least two servo readers, wherein the servo readers are symmetrically positioned about the contiguous group of transducers, wherein the servo readers are asymmetrically positioned relative to a centerline of the array of transducers.

2. An apparatus as recited in claim 1, wherein the format specifies a number of active channels, locations of data tracks on a magnetic recording tape, and a contiguous spare area on the magnetic recording tape,
    wherein the format also specifies backward compatibility with a second format,
    wherein the second format specifies a smaller number of active channels than the number of active channels specified by the format.

3. An apparatus as recited in claim 2, wherein the format specifies servo tracks being centered relative to a contiguous group of data tracks written according to the format,
    wherein the contiguous spare area is immediately proximate to one of the servo tracks.

4. An apparatus as recited in claim 2, wherein the second format is a legacy format.

5. An apparatus as recited in claim 1, wherein an end transducer in the array of transducers is inactive.

6. An apparatus as recited in claim 1, further comprising:
    a drive mechanism for passing a magnetic medium over the array of transducers; and
    a controller directly electrically coupled to each of the transducers.

7. An apparatus as recited in claim 6, where the controller is configured to activate data channels thereof depending on a tape motion direction.

8. An apparatus as recited in claim 7, wherein all of the data channels are active in one mode of operation.

9. An apparatus as recited in claim 1, wherein at least two servo readers are positioned external to an outermost transducer of the array of transducers and on a same side thereof.

10. An apparatus as recited in claim 9, wherein the at least two servo readers have different track widths.

11. An apparatus as recited in claim 1, comprising:
    an array of 2N+1 transducers; and
    a controller electrically coupled only to transducers in odd positions.

* * * * *